(12) United States Patent
Wood (10) Patent No.: US 7,775,477 B2
(45) Date of Patent: Aug. 17, 2010

(54) FLOOR PANEL ASSEMBLY, SYSTEM, AND ASSOCIATED METHOD

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 966 days.

(21) Appl. No.: 11/552,725

(22) Filed: Oct. 25, 2006

(65) Prior Publication Data

US 2008/0098682 A1    May 1, 2008

(51) Int. Cl.
*B64C 1/18* (2006.01)
*B64D 47/00* (2006.01)

(52) U.S. Cl. .................. 244/118.1; 244/119; 244/118.6

(58) Field of Classification Search ............. 244/117 R, 244/118.1, 118.2, 188.6, 119, 120; 211/162; 248/424, 429, 71, 228.1; 52/126.1, 126.5, 52/263, 272, 276; 296/184.1, 193.07, 87.08; 403/252–255, 348–353
See application file for complete search history.

(56) References Cited

U.S. PATENT DOCUMENTS

| | | | | |
|---|---|---|---|---|
| 2,347,473 A | * | 4/1944 | Ericksen | ....................... 30/171 |
| 2,616,230 A | * | 11/1952 | Hough | ......................... 451/544 |
| 3,842,756 A | * | 10/1974 | Marulic | ....................... 410/102 |
| 4,056,893 A | * | 11/1977 | Willard | ......................... 37/455 |
| 6,219,983 B1 | * | 4/2001 | Jensen et al. | ................ 52/403.1 |
| 7,182,291 B2 | * | 2/2007 | Westre et al. | ................ 244/119 |
| 7,350,853 B2 | * | 4/2008 | Fitze | ..................... 296/193.07 |
| 2005/0284328 A1 | * | 12/2005 | Gatto et al. | .................. 105/355 |
| 2006/0214058 A1 | * | 9/2006 | Westre et al. | ................ 244/119 |

* cited by examiner

*Primary Examiner*—Michael R Mansen
*Assistant Examiner*—Joshua J Michener
(74) *Attorney, Agent, or Firm*—Alston & Bird LLP (57) ABSTRACT

A floor panel assembly, system, and method for assembling a floor panel assembly and one or more floor beams are provided. A floor panel assembly may include a floor panel comprising a pair of opposed surfaces, wherein the floor panel includes at least one key hole slot defined in one of the opposed surfaces. The assembly also includes at least one seat track positioned between the opposed surfaces, wherein the seat track comprises at least one key hole slot defined therein that is substantially aligned with a respective key hole slot defined in the floor panel. In addition, the assembly includes at least one fastener assembly comprising a fastener configured to be positioned through a respective key hole slot defined in the floor panel and the seat track.

24 Claims, 12 Drawing Sheets

FLOOR PANEL ASSEMBLY, SYSTEM, AND ASSOCIATED METHOD

BACKGROUND OF THE INVENTION

1) Field of the Invention

Embodiments of the present invention relate to floor panels and, more particularly, to apparatus, systems, and methods for attaching a floor panel to one or more floor beams.

2) Description of Related Art

The floor of an aircraft is typically built up from a series of spaced apart transverse floor beams that span across oval hoop frames to form the structural framework for the aircraft fuselage. The floor beams are usually aluminum and are individually attached with fasteners at each end to the hoop frames via a lap joint. The joint formed between the floor beam and the hoop frame bears the transverse and shear loads applied to the floor beam. Loads applied in the fore and aft direction are bore by longitudinal shear trusses between the floor and the fuselage wall. Once the floor beams are installed, the individual components comprising the floor assembly (e.g., seat tracks, floor panels, etc.) are subsequently attached to the floor beams.

Current techniques for joining the floor beams and floor panel require precise installation of mate-drilled holes between the floor beams and the floor panel to ensure proper hole alignment for the fasteners. Future aircraft are moving away from aluminum to lightweight materials, such as composite materials. The use of composite material creates unique design, integration, and assembly issues that would normally not be problematic with respect to metallic materials.

In particular, composite materials present issues with respect to attaching composite/honeycomb floor panels to floor beams. For example, techniques for attaching composite floor panels to floor beams have been developed, such as co-bonding or co-curing the floor beams and floor panel together, as well as using a bolted attachment with titanium clips bonded to the floor beams and into titanium tubes within the floor panel. However, for replacement or repair, removal of the floor panel may necessary. Thus, a co-bonded or co-cured floor panel and floor beam assembly would require removal of the entire floor system. Although fasteners may be positioned through the holes in the seat track and into the titanium fittings, fasteners require mate-drilled holes which may increase the assembly time, introduce foreign object debris in the seat track channel, and increase the possibility of damaging the seat track holes during the drilling process. For example, fastener installation typically requires one technician above the floor and one below the floor to position and tighten each fastener, or one technician using blind fasteners, but in either case, the floor panel is typically non-removable or non-replaceable because the fasteners may not be able to be removed from the seat track once installed.

It would therefore be advantageous to provide an assembly, a system, and a method for assembling a floor panel and one or more floor beams. In addition, it would be advantageous to provide an improved assembly, system, and method for securing a floor panel to one or more floor beams that may be more efficiently assembled and disassembled. Moreover, it would be further advantageous to provide an assembly, a system, and a method for more effectively securing a floor panel to floor beams using composite materials.

BRIEF SUMMARY OF THE INVENTION

Embodiments of the invention may address at least some of the above needs and achieve other advantages by providing an assembly, a system, and a method for assembling a floor panel and one or more floor beams. Generally, embodiments of the present invention include a floor panel assembly having an integrated seat track that facilitates the attachment of the floor panel assembly to one or more floor beams. In particular, a fastener assembly is configured to be positioned within slots defined in the floor panel, seat track, and floor beam and secure the floor panel assembly and the floor beam to one another. The fastener assembly may be readily secured and removed to assemble and disassemble the floor panel assembly and the floor beam.

In one embodiment of the present invention, a floor panel assembly is provided. The floor panel assembly includes a floor panel comprising a pair of opposed surfaces, wherein the floor panel includes at least one key hole slot defined in one of the opposed surfaces. The assembly also includes at least one seat track positioned between the opposed surfaces, wherein the seat track comprises at least one key hole slot defined therein that is substantially aligned with a respective key hole slot defined in the floor panel. In addition, the assembly includes at least one fastener assembly comprising a fastener configured to be positioned through a respective key hole slot defined in the floor panel and the seat track.

According to aspects of the assembly, the seat track comprises a tube formed by a pair of U-shaped portions, wherein the tube is positioned between the opposed surfaces of the floor panel. The floor panel may include a plurality of layers of composite material, and the seat track may be embedded within one or more of the layers of the composite material. The key hole slot defined in the floor panel and the seat track may include a first portion that is larger than a second portion, and the fastener may be configured to be positioned through the first portions and moved along the second portions. The fastener assembly may include a fastener, a washer plate, and a coupling member. The coupling member may be configured to be positioned through the first portion of a respective key hole slot defined in the floor panel and the seat track, and each coupling member may be further configured to slide between the first portions and the second portions but not rotate along the second portion of a respective key hole slot defined in the seat track. In addition, each washer plate may be larger than the first portion and the second portion of a respective key hole slot defined in the floor panel and the seat track. Each seat track may include a raised boss, wherein the key hole slot is defined in the raised boss, and each seat track may include an anti-rotation slot defined about the second portion of the key hole slot defined in the raised boss.

An additional aspect of the present invention includes a floor panel system. The floor panel system includes a floor panel comprising a pair of opposed surfaces, wherein the floor panel includes at least one key hole slot defined in one of the opposed surfaces. The system also includes at least one seat track positioned between the opposed surfaces, wherein the seat track comprises at least one key hole slot defined therein and substantially aligned with a respective key hole slot defined in the floor panel. The system further includes at least one floor beam positioned adjacent to one of the opposed surfaces of the floor panel, wherein the floor beam includes at least one slot defined therein that is configured to substantially align with at least a portion of a respective key hole slot defined in the floor panel and the seat track. The floor beam may be an I-shaped member including a pair of flanges, wherein the slot is defined in a portion of one of the flanges. Moreover, the floor panel system includes at least one fastener assembly comprising a fastener configured to be positioned through a respective key hole slot defined in the floor panel and the seat track and a respective slot defined in the floor beam such that the fastener assembly is configured to secure the floor beam to the floor panel and seat track. The system could further include an aircraft structure, wherein the at least one floor beam may be coupled to the aircraft structure.

A further aspect of the present invention provides a method for assembling a floor panel assembly and at least one floor beam. The method includes positioning at least one floor panel assembly adjacent to at least one floor beam and positioning a fastener through a respective slot defined in the floor beam and the floor panel assembly. The method further includes moving the fastener to an engaged position within the respective slot defined in the floor beam and the floor panel and tightening the fastener in the engaged position to secure the floor panel assembly to the floor beam.

According to one aspect of the method, the positioning step includes positioning a coupling member secured to an end of the fastener through a respective slot defined in the floor beam and the floor panel assembly. The positioning step may include positioning the fastener through a respective slot defined in the floor beam and the floor panel assembly such that the fastener only extends partially through the floor panel assembly. In addition, the positioning step may include positioning the fastener through a respective slot defined in the floor beam and a respective key hole slot defined in the floor panel assembly. Moreover, the moving step may include sliding the coupling member along the respective slot such that the coupling member is incapable of rotating therein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
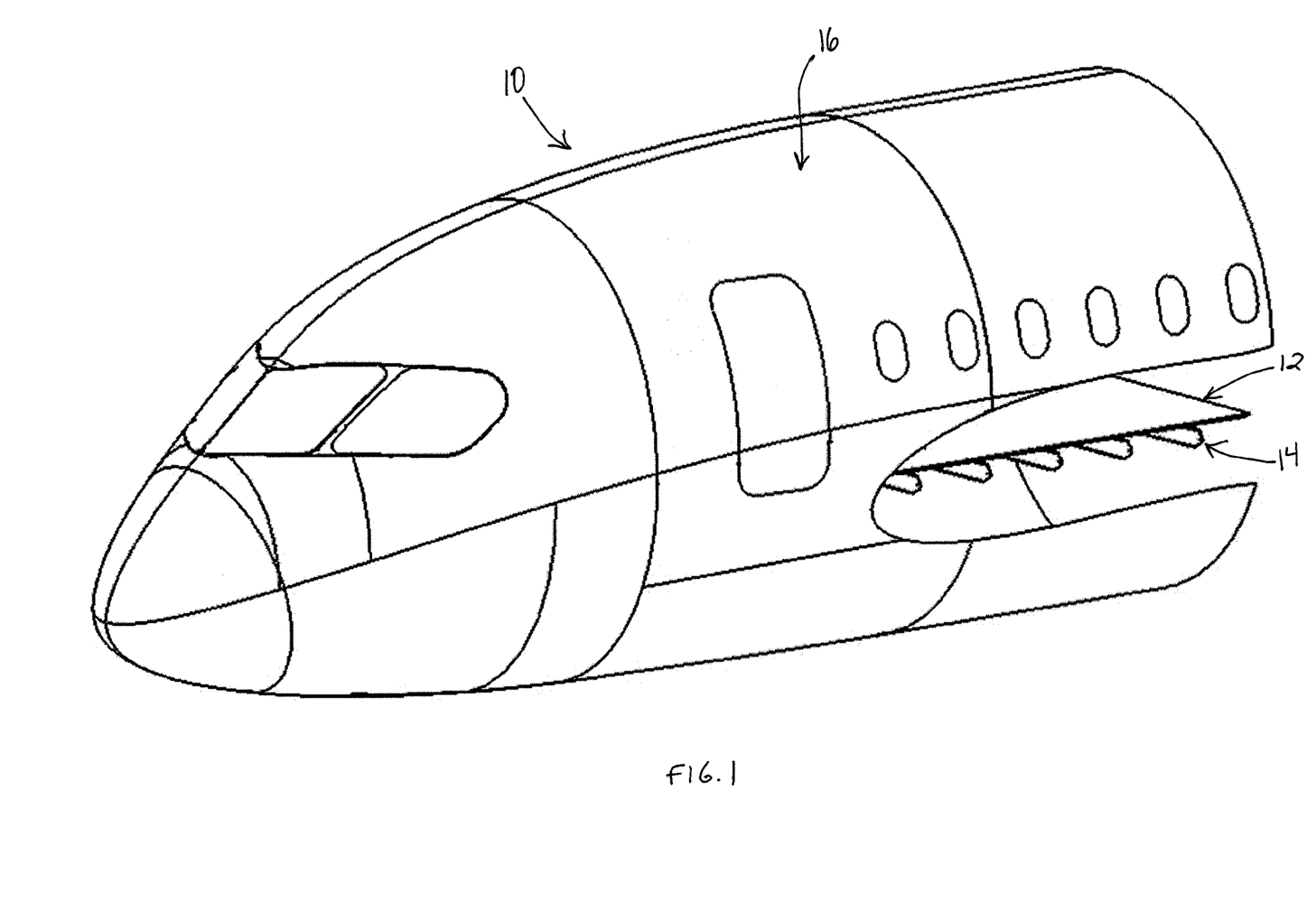
FIG. 1 is a perspective view of a system for securing a floor panel assembly to one or more floor beams according to one embodiment of the present invention.

Referring now to the drawings and, in particular to FIG. 1, there is shown a system 10 for assembling a floor panel assembly 12 and a plurality of floor beams 14 within an aircraft structure 16 according to one embodiment of the present invention. As will be described in greater detail below, the floor panel assembly 12 includes a seat track 40 and a fastener assembly 66 that facilitate the attachment of a floor panel 18 to each floor beam 14. Although the system 10 is discussed in conjunction with an aircraft structure 16, it is understood that the system may be used in a variety of industries. Thus, the floor panel assembly 12 could be utilized in a variety of industries where a floor panel assembly may be secured to one or more floor beams 14 and the like within a structure, such as in the aircraft, automotive, marine, or construction industries.

The system 10 may include a variety of components that comprise a structure. In general, an aircraft structure 16 may include a plurality of structural supports, such as hoop frames. Hoop frames, as known to those of ordinary skill in the art, are formed in a circular or other looped configuration to define the framework of the aircraft fuselage. Attached to the exterior of the hoop frames is aircraft skin. The skin may be attached to the hoop frames using shear ties, as known to those of ordinary skill in the art, and may be various materials, such as a composite (e.g., composite tape plies) and/or metallic material. The skin, as also known to those of ordinary skill in the art, may include stringers for adding structural support to the skin. Moreover, vertical stanchions may be employed for adding structural support from shear loading on the floor beams 14.

In addition, the system 10 includes a plurality of floor beams 14. Each floor beam 14 extends transversely to a longitudinal axis (i.e., a fore-aft direction) of the aircraft structure 16. In particular, each floor beam 14 is typically paired with a respective hoop frame. The floor beams 14 are capable of supporting a floor panel 18 thereon, and the floor panel is typically positioned adjacent to a plurality of floor beams 14, but could be positioned adjacent to one or more floor beams depending on the particular size and configuration of the floor panel and floor beam. The floor beams 14 may be positioned adjacent, and in a weight-bearing relationship, to support brackets and secured to the hoop frames using various techniques. For an exemplary discussion of supporting floor beams within a structure and installing a floor beam assembly within a structure, Applicants hereby incorporate by reference U.S. patent application Ser. No. 11/548,526, entitled Floor Beam Support Assembly and Associated Method, which was filed Oct. 11, 2006, and U.S. patent application Ser. No. 11/537,145, entitled Floor Beam Assembly, System, and Associated Method, which was filed on Sep. 29, 2006.

Figure 2:
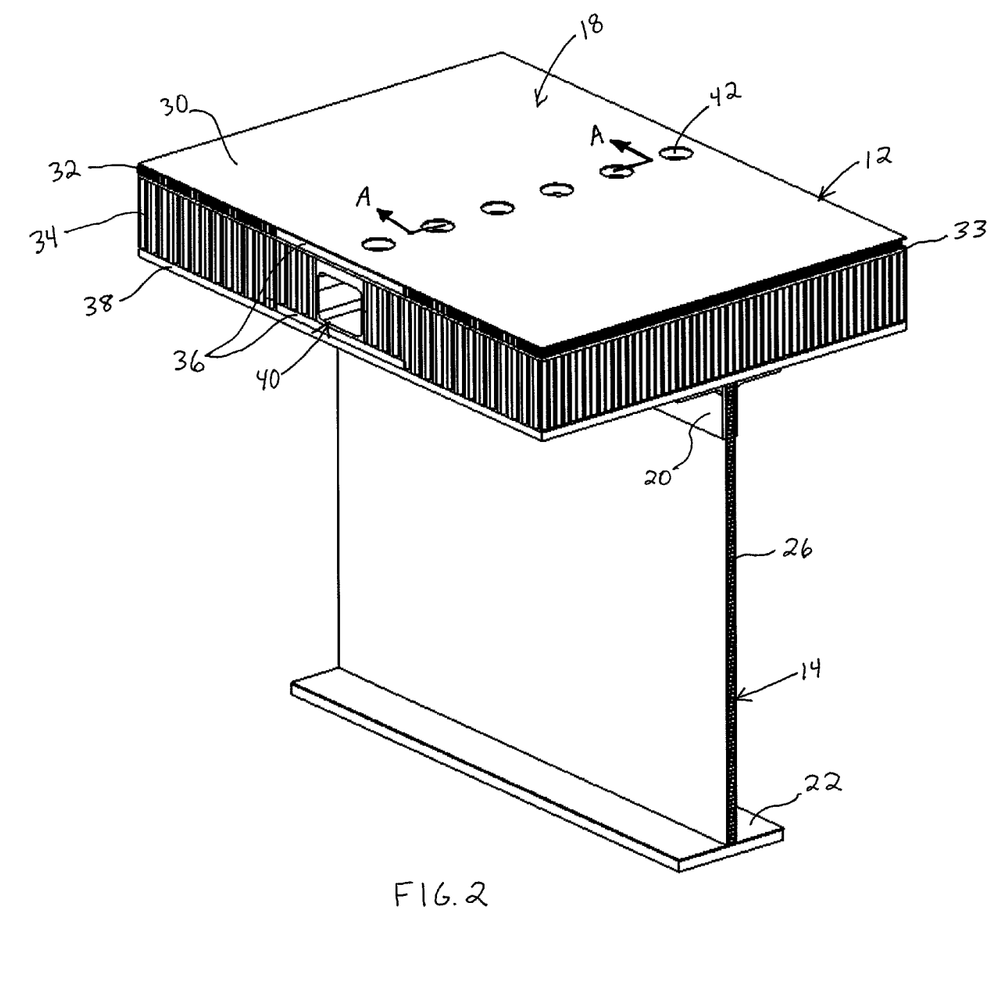
FIG. 2 is a perspective view of a floor panel assembly assembled to a floor beam according to an embodiment of the present invention.
Figure 4:
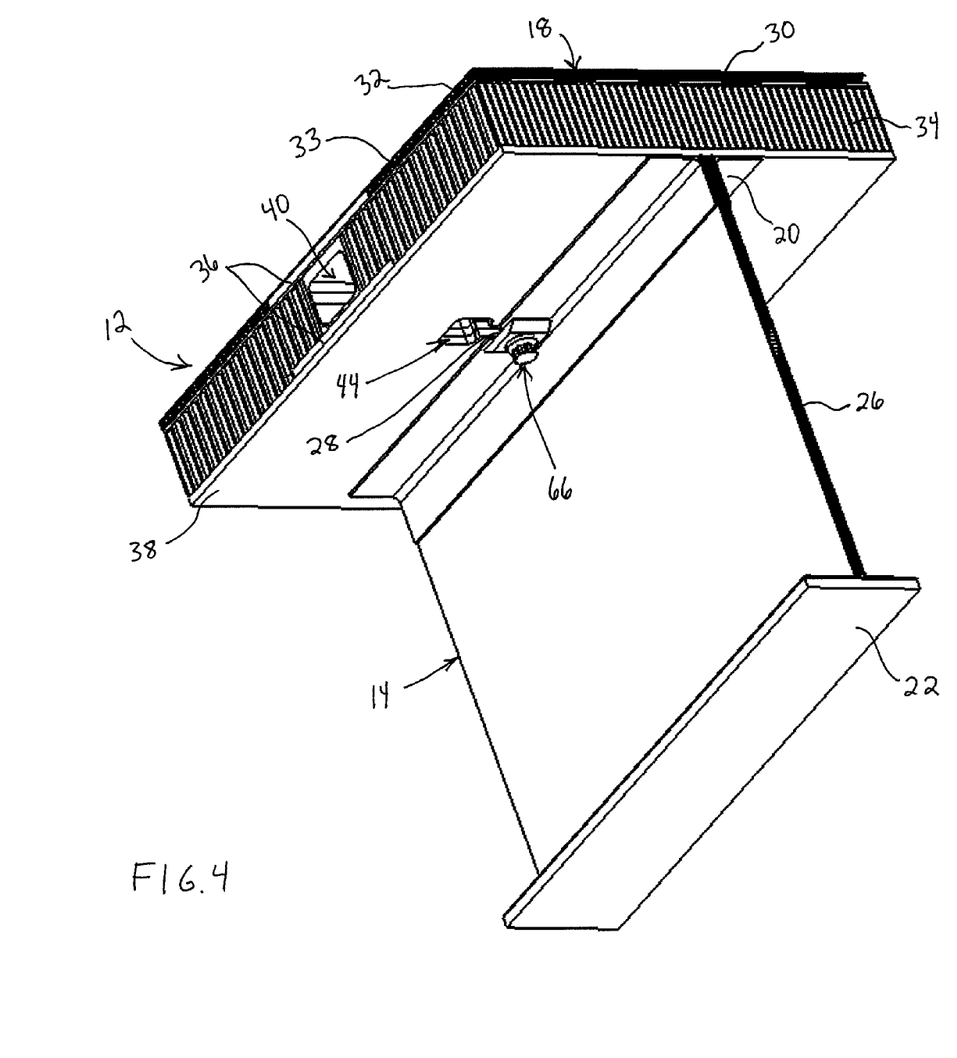
FIG. 4 is another perspective view of the floor panel assembly assembled to the floor beam shown in FIG. 2.
Figure 5:
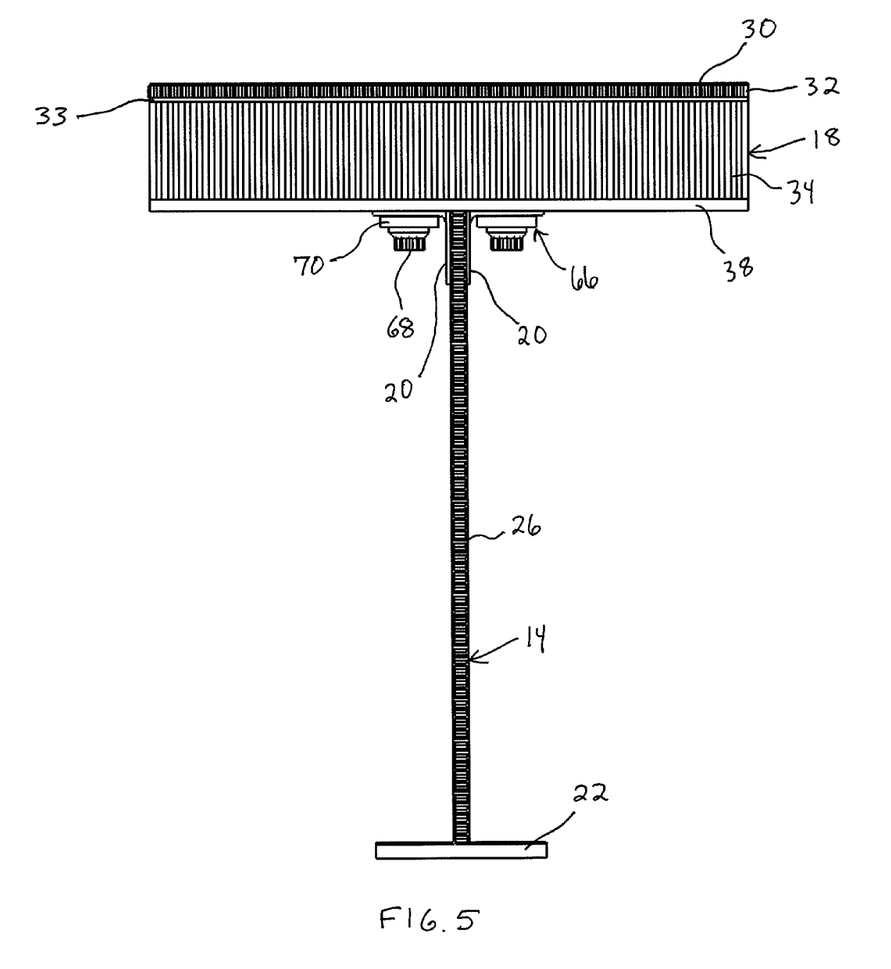
FIG. 5 is a cross-sectional elevation view of the floor panel assembly and floor beam shown in FIGS. 2 and 4.

As shown in FIGS. 2, 4, and 5, each floor beam 14 is generally I-shaped in cross section. In particular, the floor beam 14 includes an upper flange 20 and a lower flange 22 and a support 26 extending therebetween. The upper flange 20 comprises a pair of L-shaped brackets that extend on opposite sides, and along the length of, the support 26, while the lower flange 22 comprises a planar member extending along the length of, and generally perpendicular to, the support. The upper flange 20 may be a metallic material, such as titanium, but could alternatively be a composite or a combination of composite and metallic materials if desired. Similarly, the lower flange 22 may be a metallic or composite material or a combination of materials. The upper flange 20 and/or lower flange 22 may bonded or attached to the support 26 with an adhesive, fasteners, and the like. Moreover, the upper 20 and lower 22 flanges could comprise a composite material that is co-bonded or co-cured to a composite support 26. The support 26 of the floor beams 14 is typically a composite material, although the support could be a metallic material or a combination of different materials if desired.

A slot 28 is defined within a portion of the upper flange 20. In particular, the slot 28 extends inwardly from an edge of the upper flange 20 and generally perpendicular to the planar surface of the support 26. The slot 28 is spaced away from the intersection of the upper flange and the support 26, and the slot is formed in the upper flange 20 on opposite sides of the support. The slot 28 may be formed by cutting or milling the slot therein, or the slot could be preformed using various molding processes.

It is understood that the aforementioned discussion of the floor beams 14 is not meant to be limiting, as the floor beams could be various sizes and configurations according to additional aspects of the present invention. For example, the floor beams 14 may be other cross sections than I-shaped, such as a C-shaped member. Moreover, the upper 20 and lower 22 flanges could be integrally formed or molded with the support 26. The upper 20 and lower 22 flanges could be reversed such that the slot 28 is defined in the lower flange 22, and the upper and lower flanges may have the same configuration if desired (e.g., L-shaped brackets at opposite ends of the support 26). Furthermore, there may be one or more slots defined in the upper flange 20, and each slot can be various sizes and configurations depending on the fastener assembly 66 desired to be used, as explained below.

Figure 3:
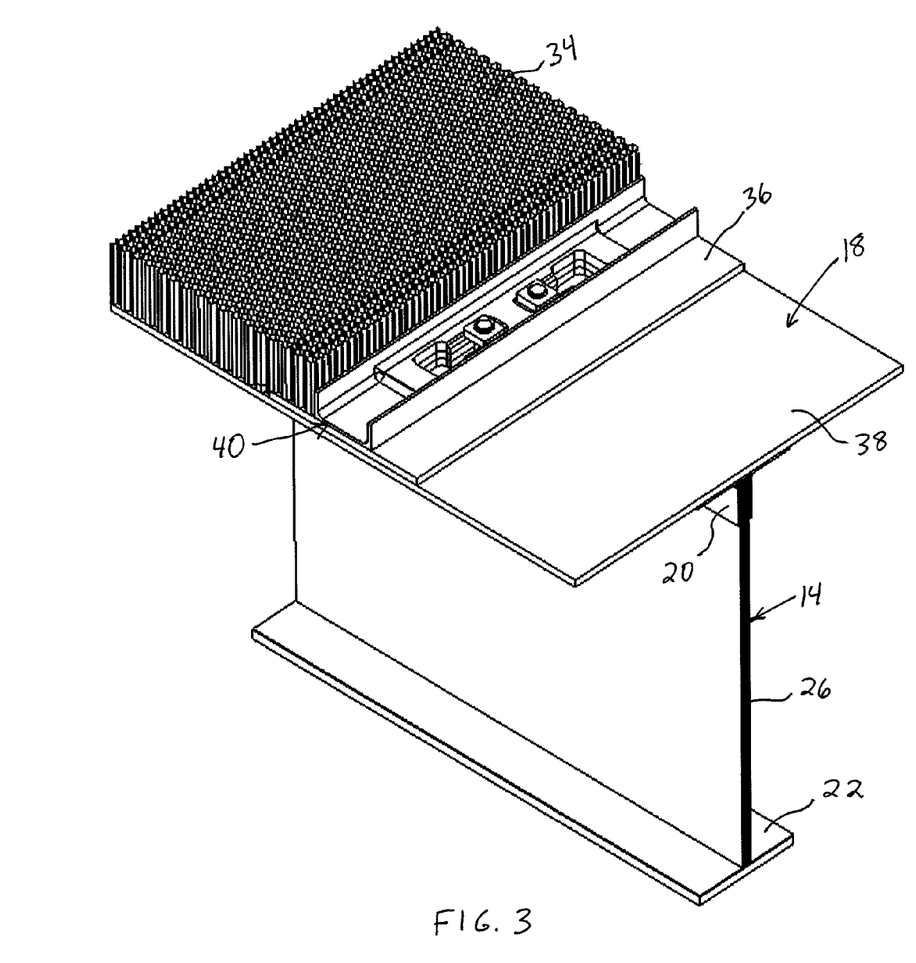
FIG. 3 is a perspective cross-sectional view of the floor panel assembly shown in FIG. 2.
Figure 3A:
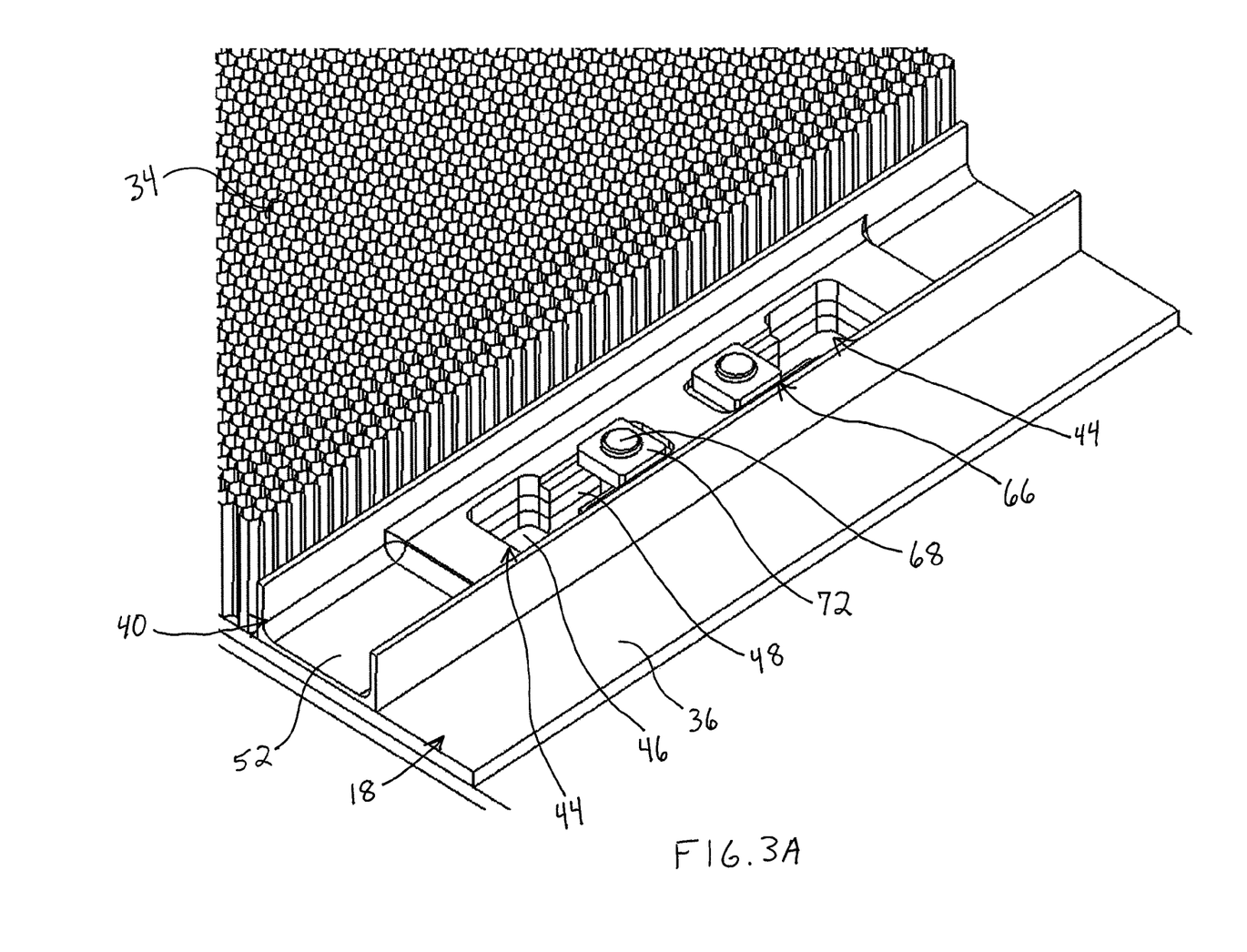
FIG. 3A is an enlarged perspective view of the cross-sectional view of the floor panel assembly shown in FIG. 3.
Figure 6:
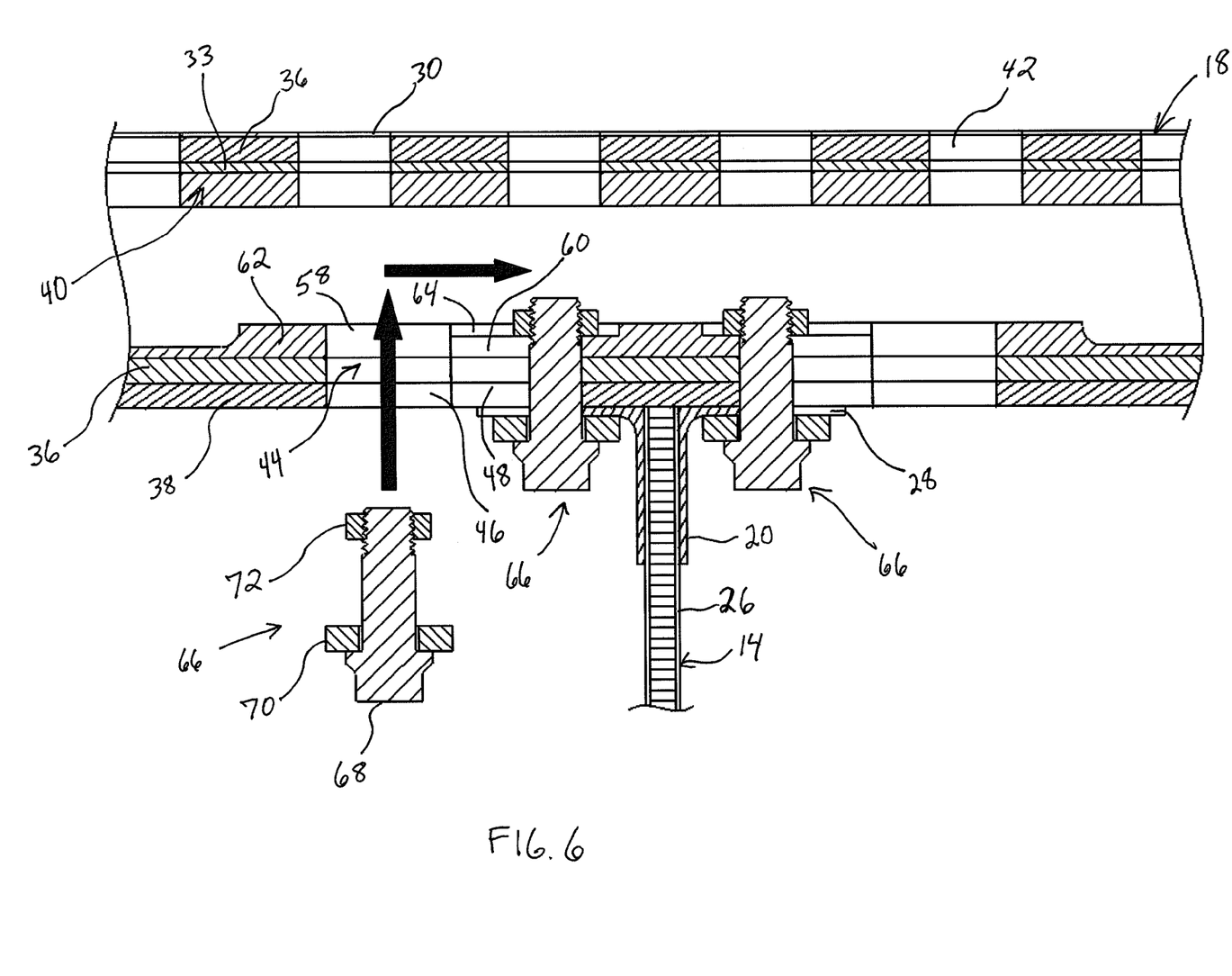
FIG. 6 is a cross-sectional view of the floor panel assembly and floor beam taken along line A-A in FIG. 2.

The floor panel 18 includes a plurality of layers of material, typically a sandwich of composite materials. For example, FIGS. 2 and 6 show that the floor panel 18 includes a first layer 30 of composite skin material, a second layer 32 of higher density composite material, a third layer 33 of thin composite material, a fourth layer 34 of honeycomb composite material, and a fifth layer 38 of composite skin material. In addition, the floor panel 18 includes a middle portion 36 of composite material extending adjacent to each of the first 30 and fifth 38 layers of skin material. The middle portion 36 also extends adjacent to, and along the length of, a seat track 40 as will be explained in further detail below. The fourth layer 34 of honeycomb material is also positioned adjacent to each side of the seat track 40 and along the length of the seat track, as shown in FIGS. 2, 3, and 3A. Each of the layers of the floor panel 18 may be formed and bonded to one another using conventional techniques as known to those of ordinary skill in the art. For example, each of the layers could be successively co-bonded or co-cured to one another such that the seat track 40 is encapsulated or otherwise embedded therein. In addition, any number and sizes of layers may be employed to form the floor panel 18, as long as the seat track 40 may be positioned and secured therein, and the floor panel may comprise one or more layers of composite material, metallic material, or combinations thereof.

Figure 4A:
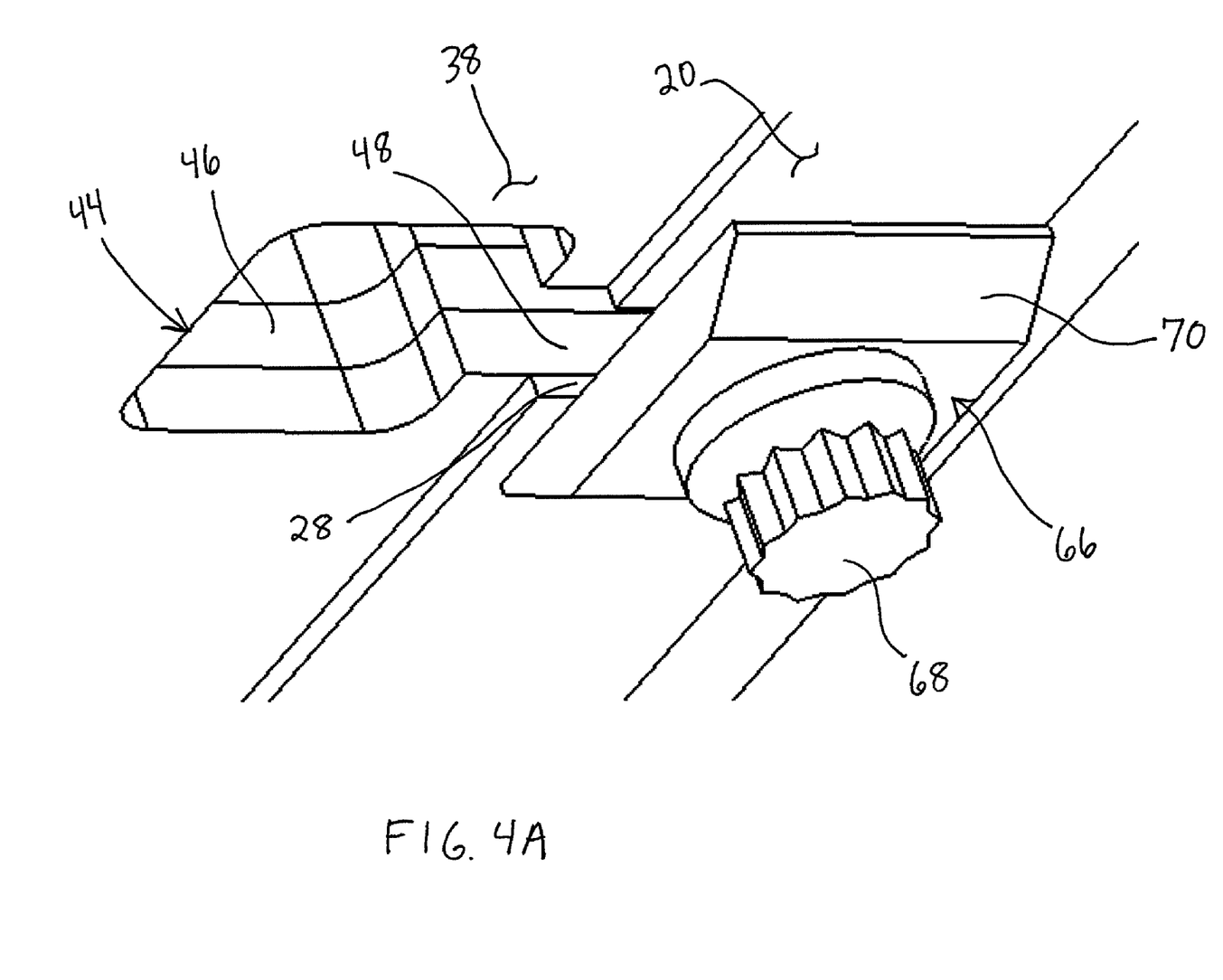
FIG. 4A is an enlarged perspective view of the floor panel assembly and floor beam shown in FIG. 4.

A plurality of holes 42 are defined within the first layer 30, the middle portion 36, and the third layer 33, as shown in FIG. 6. The holes 42 are spaced across the length of the floor panel 18 and are used to accommodate fasteners for securing seats and the like thereto. A pair of key hole slots 44 are defined in the opposite surface of the floor panel 18, namely within the middle portion 36 and the fifth layer 38 of skin material. As shown in FIGS. 4 and 4A, each key hole slot 44 includes a first portion 46 that is larger than a second portion 48. The first portion 46 is generally rectangular in configuration, while the second portion 48 is a narrower slot that substantially aligns with a respective slot 28 defined in the upper flange 20 of the floor beam 14. As will be explained in greater detail below, the key hole slot 44 is configured to align with a key hole slot 56 defined in the seat track 40, and the second portion 48 is configured to align with the slot 44 defined in the floor panel 18.

As briefly mentioned above, a seat track 40 is positioned or otherwise embedded within the floor panel 18. As shown in FIGS. 7 and 8A-8C, the seat track 40 includes an upper U-shaped member 50 and a lower U-shaped member 52 that are joined together to form a tube. The seat track 40 is typically a metallic material, such as titanium, such that the upper 50 and lower 52 U-shaped members may be joined using various techniques such as welding, soldering, and the like. When joined, the upper 50 and lower 52 U-shaped members define a channel therethrough. The channel allows fasteners to be positioned therein and may reduce the weight of the seat track 40 in comparison to a solid seat track. However, the illustrated seat track 40 is not meant to be limited to a pair of U-shaped members, as it is understood that the seat track could be various sizes and configurations or a unitary tubular member if desired. For instance, the seat track 40 could be a single C-shaped or circular member.

Figure 7:
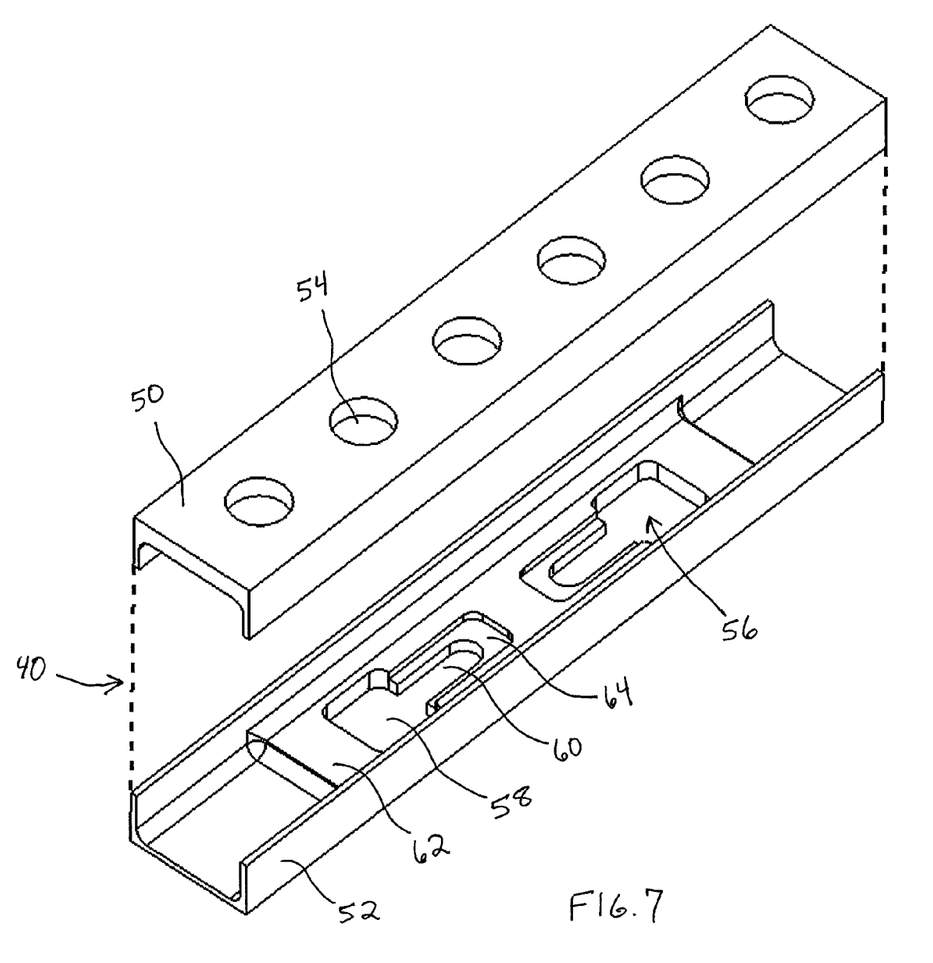
FIG. 7 is a perspective exploded view of a seat track according to one embodiment of the present invention.
Figure 8A:
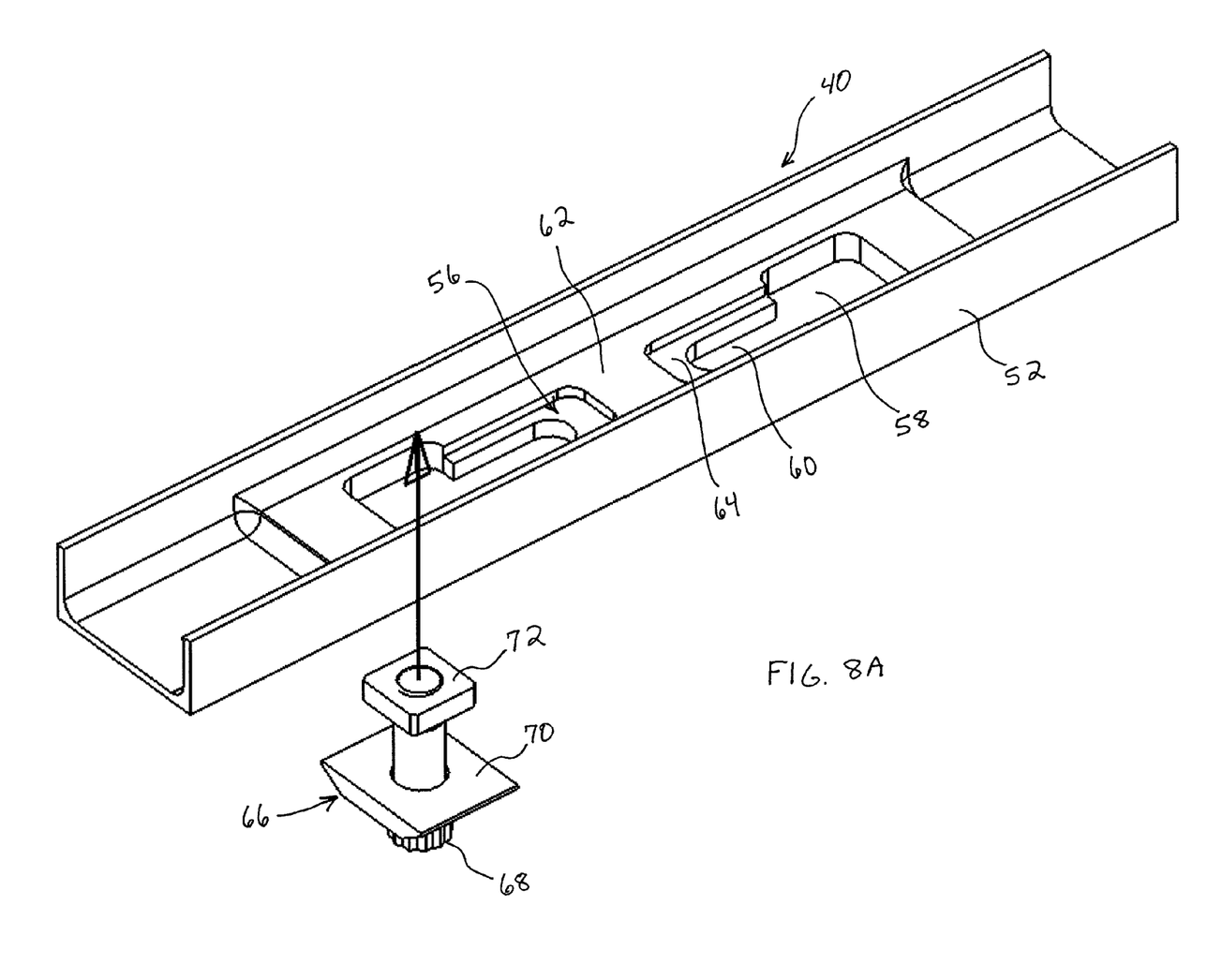
FIGS. 8A-8C are perspective views illustrating the sequence of positioning a fastener assembly within a seat track according to an embodiment of the present invention.
Figure 8B:
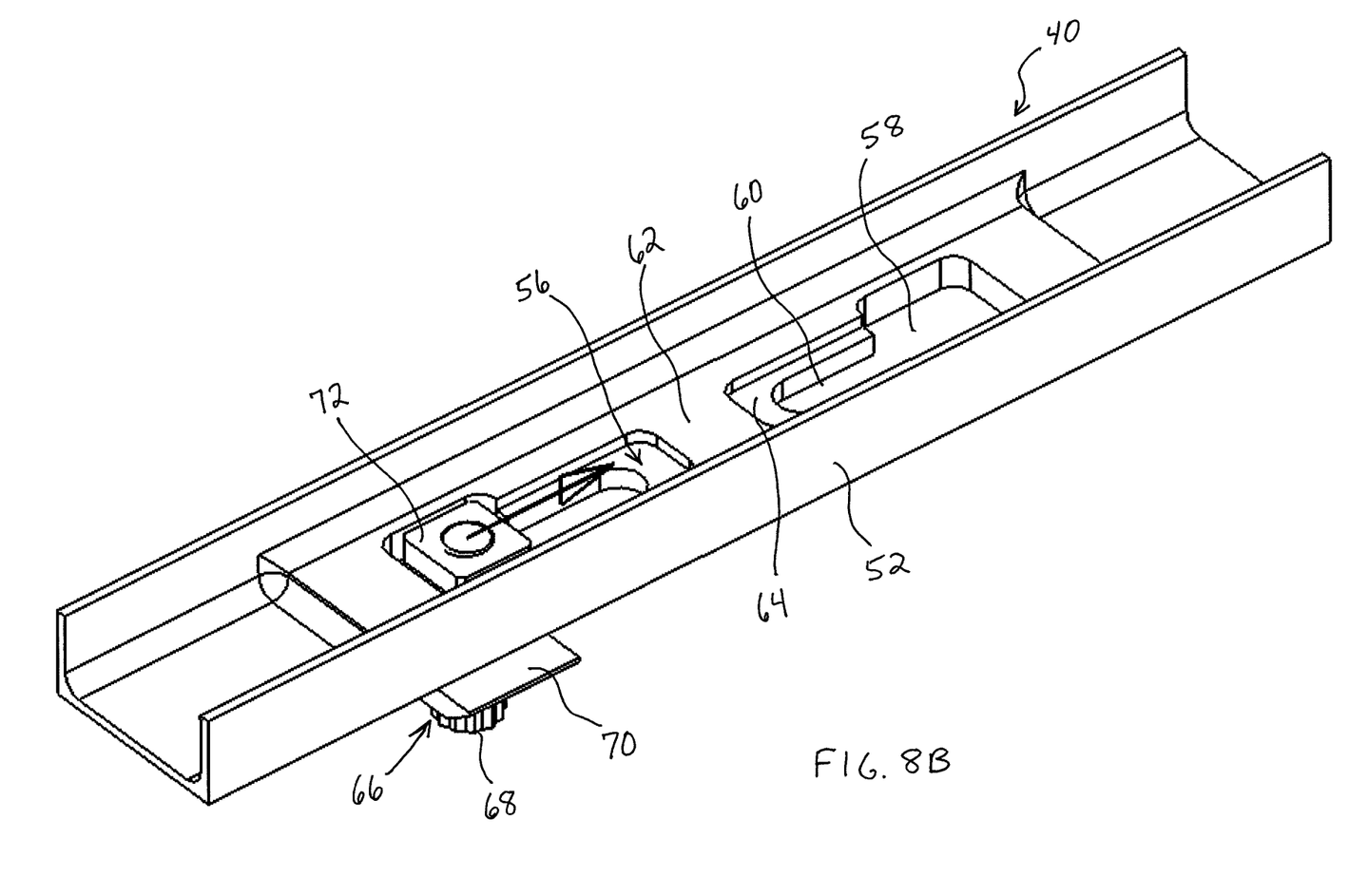
Figure 8C:
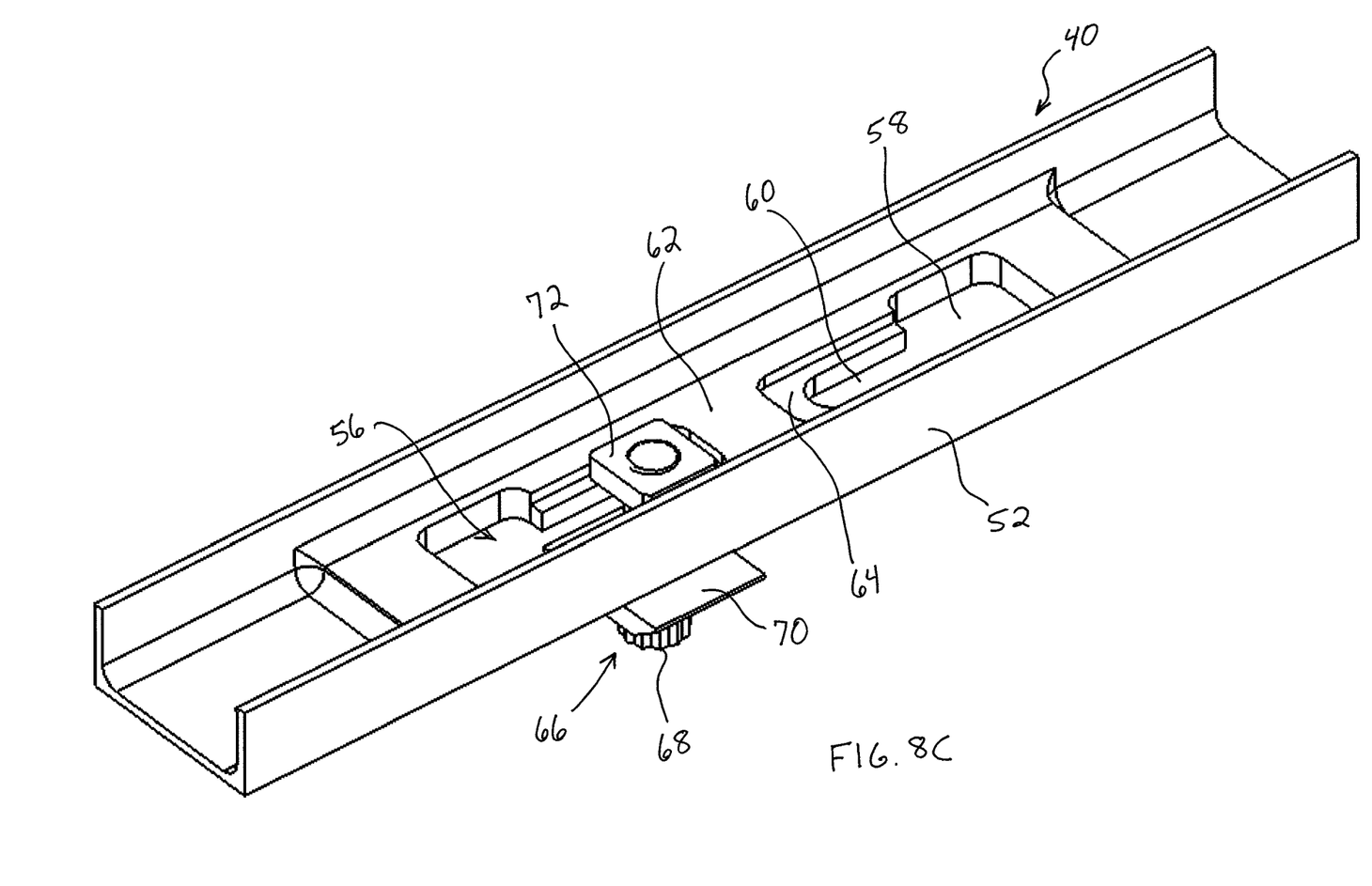

A plurality of holes 54 are defined in the upper U-shaped member 50 that are configured to substantially align with the holes 42 defined within the floor panel 18. In general, the holes 42 and 54 would be formed after the floor panel 18 and seat track 40 have been assembled to ensure proper hole alignment, although the holes could be formed in individual processes prior to assembling the floor panel and seat track. The holes 42 and 54 are generally circular for accommodating fasteners and the like, but could be other configurations (e.g., rectangular hole, longitudinal slot, etc.) depending on the desired fastening technique employed.

Furthermore, a pair of key hole slots 56 are defined in the lower U-shaped member 52. Similar to the key hole slots 44 defined in the floor panel 18, each key hole slot 56 includes a first portion 58 that is larger than a second portion 60. The key hole slots 56 are defined such that the second portions 60 of each key hole slot are positioned proximate to one another (i.e., the key hole slots are mirrored about the midpoint of the seat track 40). The key hole slots 56 are substantially the same size as the key hole slots 44 defined in the floor panel 18 such the key hole slots may be substantially aligned with one another. The key hole slots 44 and 56 could be formed in separate tooling operations (e.g., milling), or the key hole slots could be formed concurrently while assembled in order to ensure more accurate alignment.

As also depicted in FIG. 7, the lower U-shaped member 52 may include a raised boss 62 extending along a portion of its length spanning the key hole slots 56. Thus, the key hole slots 56 are defined in the raised boss 62. The raised boss 62 adds additional structural support when attaching fasteners and the like thereto. Moreover, an anti-rotation slot 64 may be defined within the boss 62 and along the outer periphery of the second portion 60 of the key hole slot 56. The anti-rotation slot 64 extends partially within the thickness of the boss 62, and is capable of accommodating a coupling member or nut 72 to prevent rotation of the nut therein, as explained below. As shown in FIG. 6, the anti-rotation slot 64 extends slightly beyond the second portions 48 and 60 of the key hole slots 44 and 56, respectively, in order to provide sufficient space for the nut. Although the raised boss 62 is shown extending along a portion of the lower U-shaped member 52, the raised boss could extend along the entire length of the lower U-shaped member (i.e., increasing the thickness of the U-shaped member without a boss), and could be various thicknesses depending on the amount of support desired and the type of fastener used. In addition, the upper U-shaped member 50 could also include a raised boss proximate to the holes 54 or along its entire length. Furthermore, the anti-rotation slot 64 is optional and may not be necessary where the nut 72 is positioned adjacent to the seat track 40 proximate to the second portion 60 of the key hole slot 56 but is otherwise incapable of being pulled through the second portion with a force applied generally perpendicular to the floor panel 18 and floor beam 14.

It is also understood that the illustrated key hole slots 44 and 56 and slot 28 are not meant to be limiting and may be various sizes and configurations according to additional aspects of the present invention. For example, the key hole slots 44 and 56 may be configured to accommodate any number of fasteners and only require a first portion that is larger than a second portion. Thus, the first and second portions of the key hole slots 44 and 56 could be rectangular, round, hexagonal, triangular, etc. Similarly, the slot 28 defined in the floor beam 14 may also be various sizes and configurations, as the slot need only be aligned with the second portions of respective key hole slots 44 and 56. Furthermore, although only a single key hole slot 44 is shown as being defined in the floor panel 18, there may be one or more key hole slots defined therein in order to facilitate the attachment of any number of floor beams 14 thereto. The seat track 40 may also include one or more key hole slots 56 depending on the configuration of the floor beam 14 used and the degree of attachment desired between the seat track and the floor beam.

FIGS. 3A, 4A, 5, and 6 illustrate a fastener assembly 66 secured to the floor beam assembly 12 and floor beam 14. More specifically, the fastener assembly 66 includes a fastener 68, a washer plate 70, and a nut 72. The fastener 68 is of sufficient length and diameter to be positioned within the key hole slots 44 and 56 and slot 44 defined in the floor beam 14. In particular, the nut 72 is generally rectangular in configuration and is sized to fit through the first portions 46 and 58 of the floor panel 18 and seat track 40, respectively, and within the channel of the seat track. Moreover, the nut 72 is sized and configured to move along the second portions 48 and 60 of the floor panel 18 and seat track 40. More specifically, the nut 72 may be sized and configured to slide within the anti-rotation slot 64 defined in the seat track 40 such that the nut is incapable of being pulled through the second portions 48 and 60 of the floor panel 18 and seat track and is also incapable of rotating within the anti-rotation slot. The washer plate 70 is generally rectangular in cross-section and larger than the first and second portions of the key hole slots 44 and slot 28. In general, the washer plate 70 is capable of being positioned between the upper portion 20 of the floor beam 14 and the fastener 68 in order to increase the tightness therebetween and distribute the force applied by the fastener.

It is understood that the illustrated embodiment is not meant to be limiting, as the fastener assembly 66 may be various sizes and configurations. For example, the nut 72 may be a coupling member of a variety of sizes and configurations, as long as the coupling member is capable of being positioned through the first portions 46 and 58, as well as moved along and prevented from being removed or pulled out from the second portion 60 of the seat track 40 with a force applied through the fastener 68 that is generally perpendicular to the floor panel 18 and floor beam 14. Similarly, the washer plate 70 may be any size and configuration (e.g., round) that is incapable of being moved or fit through the second portions 48 and 60 (while being mounted on the fastener 68) and configured to lie adjacent to the fastener 68 and floor beam 14. The fastener 66 may be any suitable bolt or device for joining the floor panel assembly 12 and floor beam 14, but typically includes threads in order to engage the nut 72 and tighten the fastener.

In order to secure the floor panel assembly 12 to one or more floor panels 14, a floor panel assembly 12 is positioned adjacent to at least one floor beam 14 such that the second portions 48 and 60 substantially align with the slot 28 of the floor beam. FIGS. 6 and 8A-8C illustrate that the fastener assembly 66 is preassembled (the upper U-shaped member 50 is omitted for clarity). The nut 72 and a portion of the fastener 68 are positioned through the first portions 46 and 58 of respective key hole slots 44 and 56, respectively. The entire fastener assembly 66 is then moved from the first portions 46 and 58 to respective second portions 48 and 60 of key hole slots 44 and 56. Thus, the fastener 68 is moved to an engaged position within the second portions 48 and 60, which could be any position along the second portions 48 and 60 that prevents the nut 72 from being pulled through the second portions. For instance, the nut 72 may be slid along the anti-rotation slot 64 defined in the raised boss 62. As shown in FIG. 6, the fastener 68 is typically positioned adjacent to an innermost edge of the second portions 48 and 60 of respective key hole slots 44 and 56, and the fastener is then tightened to secure the floor panel assembly 12 and floor beam 14.

Thus, embodiments of the present invention may provide several advantages. For example, the floor panel assembly 12 may be readily positioned and secured to one or more floor beams 14. Thus, embodiments of the present invention may reduce the assembly time and manpower required to assemble a floor panel 18 to a floor beam 14, and the floor beam assembly 12 may be readily disassembled from the floor beams for repair or replacement. In particular, the configuration of the key hole slots 44 and 56 facilitate "blind" attachment of the fasteners such that the need for two technicians to secure a floor panel 18 to a floor beam 14 may be eliminated. Moreover, the floor panel assembly 12 may also effectively secure the floor panel assembly 12 to one or more floor beams 14 comprising a variety of materials, such as composite materials, that are lightweight and capable of being readily assembled and disassembled from one another.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A floor panel assembly comprising:
    a floor panel comprising a pair of opposed surfaces, wherein the floor panel comprises at least one key hole slot defined in one of the opposed surfaces;
    at least one seat track positioned between the opposed surfaces, wherein the seat track comprises at least one key hole slot defined therein and substantially aligned with a respective key hole slot defined in the floor panel;

at least one fastener assembly comprising a fastener configured to be inserted through a respective key hole slot defined in the floor panel and the seat track and moved laterally along a respective key hole slot to an engaged position;

wherein each seat track comprises a raised boss, and wherein the at least one key hole slot is defined in the raised boss; and wherein the at least one key hole slot of the floor panel and the seat track each comprises a first portion that is larger than a second portion, and wherein each seat track comprises an anti-rotation slot defined about the second portion of the at least one key hole slot defined in the raised boss.

2. The assembly according to claim 1, wherein the at least one seat track comprises a tube formed by a pair of U-shaped portions, and wherein the tube is positioned between the opposed surfaces of the floor panel.

3. The assembly according to claim 1, wherein the floor panel comprises a plurality of layers of composite material, and wherein the seat track is embedded within one or more of the layers of the composite material.

4. The assembly according to claim 1, wherein the fastener is configured to be inserted through the first portions and moved laterally along the second portions.

5. The assembly according to claim 1, wherein the fastener assembly further comprises a washer plate and a coupling member, and wherein the coupling member is configured to be positioned through the first portion of a respective key hole slot defined in the floor panel and the seat track.

6. The assembly according to claim 5, wherein each coupling member is configured to slide between the first portions and the second portions but not rotate along the second portion of a respective key hole slot defined in the seat track.

7. The assembly according to claim 5, wherein each washer plate is larger than the first portion and the second portion of a respective key hole slot defined in the floor panel and the seat track.

8. The assembly according to claim 1, further comprising a plurality of fastener assemblies, wherein the floor panel and the at least one seat track each comprises a pair of key hole slots, and wherein a first fastener is configured to be inserted through a first respective key hole slot defined in the floor panel and the seat track and a second fastener is configured to be inserted through a second respective key hole slot defined in the floor panel and the seat track.

9. The assembly according to claim 8, wherein the first and second fasteners are configured to be moved laterally within the first and second key hole slots in opposite directions and towards one another to a respective engaged position.

10. A floor panel system comprising:
a floor panel comprising a pair of opposed surfaces, wherein the floor panel comprises at least one key hole slot defined in one of the opposed surfaces;
at least one seat track positioned between the opposed surfaces, wherein the seat track comprises at least one key hole slot defined therein and substantially aligned with a respective key hole slot defined in the floor panel;
at least one floor beam positioned adjacent to one of the opposed surfaces of the floor panel, wherein the floor beam comprises at least one slot defined therein that is configured to substantially align with at least a portion of a respective key hole slot defined in the floor panel and the seat track;

at least one fastener assembly comprising a fastener configured to be inserted through a respective key hole slot defined in the floor panel and the seat track and a respective slot defined in the floor beam and moved laterally along a respective key hole slot to an engaged position such that the fastener assembly is configured to secure the floor beam to the floor panel and seat track;

wherein each seat track comprises a raised boss, and wherein the at least one key hole slot is defined in the raised boss; and wherein the at least one key hole slot of the floor panel and the seat track each comprises a first portion that is larger than a second portion, and wherein each seat track comprises an anti-rotation slot defined about the second portion of the at least one key hole slot defined in the raised boss.

11. The system according to claim 10, wherein the at least one seat track comprises a tube formed by a pair of U-shaped portions, and wherein the tube is positioned between the opposed surfaces of the floor panel.

12. The system according to claim 10, wherein the floor panel comprises a plurality of layers of composite material, and wherein the seat track is embedded within one or more of the layers of the composite material.

13. The system according to claim 10, wherein the fastener is configured to be inserted through the first portions and moved laterally along the second portions.

14. The system according to claim 10, wherein the fastener assembly further comprises a washer plate and a coupling member, and wherein the coupling member is configured to be positioned through the first portion of a respective key hole slot defined in the floor panel and the seat track.

15. The system according to claim 14, wherein each coupling member is configured to slide between the first portions and the second portions but not rotate along the second portion of a respective key hole slot defined in the seat track.

16. The system according to claim 14, wherein each washer plate is larger than the first portion and the second portion of a respective key hole slot defined in the floor panel and the seat track.

17. The system according to claim 10, wherein the at least one floor beam is an I-shaped member comprising a pair of flanges, and wherein the slot is defined in a portion of one of the flanges.

18. The system of claim 10, further comprising an aircraft structure, wherein the at least one floor beam is coupled to the aircraft structure.

19. The system of claim 10, wherein the at least one floor beam comprises a flange having an outer edge, and wherein the slot extends inwardly from the outer edge.

20. The system of claim 10, wherein the slot of the floor beam is configured to substantially align with the second portion of a respective key hole slot defined in the floor panel and the seat track.

21. A method for assembling a floor panel assembly and at least one floor beam comprising:
positioning at least one floor panel assembly adjacent to at least one floor beam, the floor panel assembly comprising:
a floor panel comprising a pair of opposed surfaces, wherein the floor panel comprises at least one key hole slot defined in one of the opposed surfaces;
at least one seat track positioned between the opposed surfaces, wherein the seat track comprises at least one key hole slot defined therein and substantially aligned with a respective key hole slot defined in the floor panel, wherein each seat track comprises a raised boss, wherein the at least one key hole slot is defined in the raised boss, wherein the at least one key hole slot of the floor panel and the seat track each comprises a first portion that is larger than a second portion, and wherein each seat track comprises an anti-rotation slot defined about the second portion of the at least one key hole slot defined in the raised boss; and at least one fastener assembly comprising a fastener, wherein the floor beam comprises at least one slot defined therein that is configured to substantially align with at least a portion of a respective key hole slot defined in the floor panel and the seat track;

inserting the fastener through a respective slot defined in the floor beam and a respective key hole slot defined in the floor panel and the seat track;

moving the fastener laterally to an engaged position within the respective slot defined in the floor beam and the respective key hole slots defined in the floor panel and the seat track; and tightening the fastener in the engaged position to secure the floor panel assembly to the floor beam.

22. The method according to claim 21, wherein inserting comprises inserting a coupling member secured to an end of the fastener through a respective key hole slot defined in the floor panel and the seat track.

23. The method according to claim 21, wherein inserting comprises inserting the fastener through a respective slot defined in the floor beam and a respective key hole slot defined in the floor panel and the seat track such that the fastener only extends partially through the floor panel assembly.

24. The method according to claim 22, wherein moving comprises sliding the coupling member along the respective key hole slot defined in the floor panel and the seat track such that the coupling member is incapable of rotating therein.

* * * * *